United States Patent
Curl

[19]

[11] Patent Number: 6,161,646
[45] Date of Patent: Dec. 19, 2000

[54] TURBO-GENERATOR EXHAUST NOISE SILENCER

[75] Inventor: Bruce L. Curl, Jackson, Mich.

[73] Assignee: Eaton Aeroquip Inc., Maumee, Ohio

[21] Appl. No.: 09/376,744

[22] Filed: Aug. 17, 1999

[51] Int. Cl.⁷ .................................................. F01N 1/10
[52] U.S. Cl. .......................... 181/252; 181/256; 181/258; 181/238; 181/272
[58] Field of Search ..................... 181/255, 256, 181/258, 264, 269, 272, 266, 267, 238, 222, 224, 282

[56] References Cited

U.S. PATENT DOCUMENTS

| | | |
|---|---|---|
| 2,050,581 | 8/1936 | Orem . |
| 2,078,754 | 4/1937 | Day . |
| 2,103,810 | 12/1937 | Caspar . |
| 2,741,325 | 4/1956 | Brown et al. . |
| 3,196,977 | 7/1965 | Sanders . |
| 3,616,721 | 11/1971 | Laukhuff . |
| 3,642,095 | 2/1972 | Fujii . |
| 3,763,950 | 10/1973 | Rockwell . |
| 4,180,141 | 12/1979 | Judd ......................................... 181/164 |
| 4,263,982 | 4/1981 | Feuling . |
| 4,372,421 | 2/1983 | Jackson .................................... 181/258 |
| 4,424,883 | 1/1984 | Musiani .................................... 181/258 |
| 4,635,753 | 1/1987 | Itani . |
| 5,266,755 | 11/1993 | Chien ....................................... 181/258 |

*Primary Examiner*—Khanh Dang
*Attorney, Agent, or Firm*—Dinsmore & Shohl LLP

[57] ABSTRACT

A silencer for reducing acoustic energy in an exhaust stream of gases from a combustion type source, particularly turbo-generators. In a preferred embodiment, the silencer includes an outer housing having at least one outlet opening and an inner housing provided at least partially within the outer housing. The inner housing has at least one inlet opening for receiving the exhaust stream along a flow axis and the inlet opening is in fluid communication with the outlet opening. The inner housing further includes an acoustic energy interface surface having acoustic absorbing elements oriented in a substantially non-normal direction to the flow axis. Sound absorbing material is preferably contained between the outer housing and the inner housing. In this way, the gas flow is effectively separated from the acoustic energy without significantly increasing the back pressure or resistance to flow of the exhaust stream.

26 Claims, 6 Drawing Sheets

TURBO-GENERATOR EXHAUST NOISE SILENCER

TECHNICAL FIELD

The present invention relates, in general, to sound attenuation devices such as silencers, and more particularly, to sound attenuation devices for use with turbo-generators or other combustion type sources.

BACKGROUND OF THE INVENTION

In many devices such as turbo-generators, engines, machinery, industrial equipment and other combustion type sources, considerable acoustic energy travels with exhaust gasses. The high noise level associated with such devices can be objectionable and must often be reduced. As a result, a wide variety of silencers and other sound attenuation reducing devices have been developed.

Some mufflers or silencers use a series of tubes, baffles and chambers of varying shapes and sizes to alter the path of the exhaust gases over a short distance. While such mufflers may be effective in reducing noise levels, they tend to create undesirably high back pressure on the engine, resulting in lower engine power output and lower efficiency. Other mufflers direct the exhaust gases straight through a perforated tube within a larger tube, with sound absorbing material such as glass wool located between the two tubes. These so called sound absorbing material such as glass wool located between the two tubes. These so called "glass-pack" mufflers produce low back pressure, but are not very effective in reducing noise levels.

Attempts have been made to combine tubes, baffles, and chambers with sound absorbing materials to improve efficiency. While these designs somewhat combine the noise reduction characteristics of the baffle-type muffler and the low back pressure of the straight through type muffler, there remains a need for a silencer which achieves high engine efficiency through minimum increase in back pressure and also achieves maximum reduction in noise. Moreover, designs which have been available can have a number of interconnected parts, which add to their cost and complexity.

Thus, there is a continuing need for improved silencers for use with turbo-generators or the like.

SUMMARY OF THE INVENTION

Accordingly, it is an object of the present invention to obviate the above-described problems and shortcomings of the silencers heretofore available in the industry. More particularly, it is an object of the present invention to provide a silencer which attenuates the acoustic energy associated with exhaust streams without significantly increasing back pressure or resistance to flow of the exhaust stream.

It is a further object of the present invention to provide stream control apparatus for exhaust streams issuing from turbo-generators, engines, machinery, industrial equipment and other combustion type sources, and particularly apparatus which is adapted to control the generation and attenuation of noise associated with high-velocity streams of exhaust gasses.

It is a further object of the present invention to provide a silencer which has no moving parts and which may be operated in rugged and even contaminated environments.

It is a further object of the present invention to provide a silencer which has a low cost of manufacture with regard to both materials and labor.

It is a further object of the present invention to provide a silencer which requires less welding for assembly.

It is still a further object of the present invention to provide a silencer which is of a durable and reliable construction.

To achieve the foregoing and other objects and in accordance with one aspect of the present invention, there is provided a silencer for reducing acoustic energy in an exhaust stream from a combustion type source, particularly turbo-generators. The silencer includes an outer housing having at least one outlet opening and an inner housing provided at least partially within the outer housing. The inner housing has at least one inlet opening for receiving the exhaust stream along a flow axis and the inlet opening is in fluid communication with the outlet opening. The inner housing further includes an acoustic energy interface surface having acoustic absorbing elements oriented in a substantially non-normal direction to the flow axis. Sound absorbing material is preferably contained between the outer housing and the inner housing. In this way, the gas flow is effectively separated from the acoustic energy without significantly increasing the back pressure or resistance to flow of the exhaust stream.

Another embodiment of the invention comprises a silencer with an outer housing having at least one outlet opening. The silencer further includes a middle housing provided at least partially within the outer housing and an inner housing provided at least partially within the middle housing. At least one inlet opening is defined between the middle and inner housings for receiving the exhaust stream along a flow axis and the inlet opening is in fluid communication with the outlet opening. The inner and middle housings further include an acoustic energy interface surface having acoustic absorbing elements oriented in a substantially non-normal direction to the flow axis. At least one of the acoustic interface surfaces is located along the flow axis. A first sound absorbing material is preferably contained within the inner housing and a second sound absorbing material is preferably contained between the outer and middle housings.

Still other objects of the present invention will become apparent to those skilled in this art from the following description wherein there is shown and described alternative exemplary embodiments of this invention. As will be realized, the invention is capable of other different, obvious aspects and embodiments, all without departing from the invention. Accordingly, the drawings and description should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Reference will now be made in detail to preferred embodiments of the present invention, examples of which are illustrated in the accompanying drawings wherein like numerals indicate the corresponding structure throughout the views. As will be understood hereafter, the most preferred embodiments of the present invention relate to improved sound attenuation devices or silencers for use with turbo-generators. While the present invention is described hereafter with respect to a preferred silencer for turbo-generators, however, it should be understood that the present invention can be adapted for any other uses and applications or configured to control the generation, transmission and propagation of noise associated with other exhaust producing devices. For example, the silencer of the present invention might also be suitable for reducing or eliminating undesirable acoustic energy that travels with exhaust gasses issuing from machinery, internal combustion engines, industrial equipment and other combustion type sources without significantly increasing back pressure.

Figure 1:
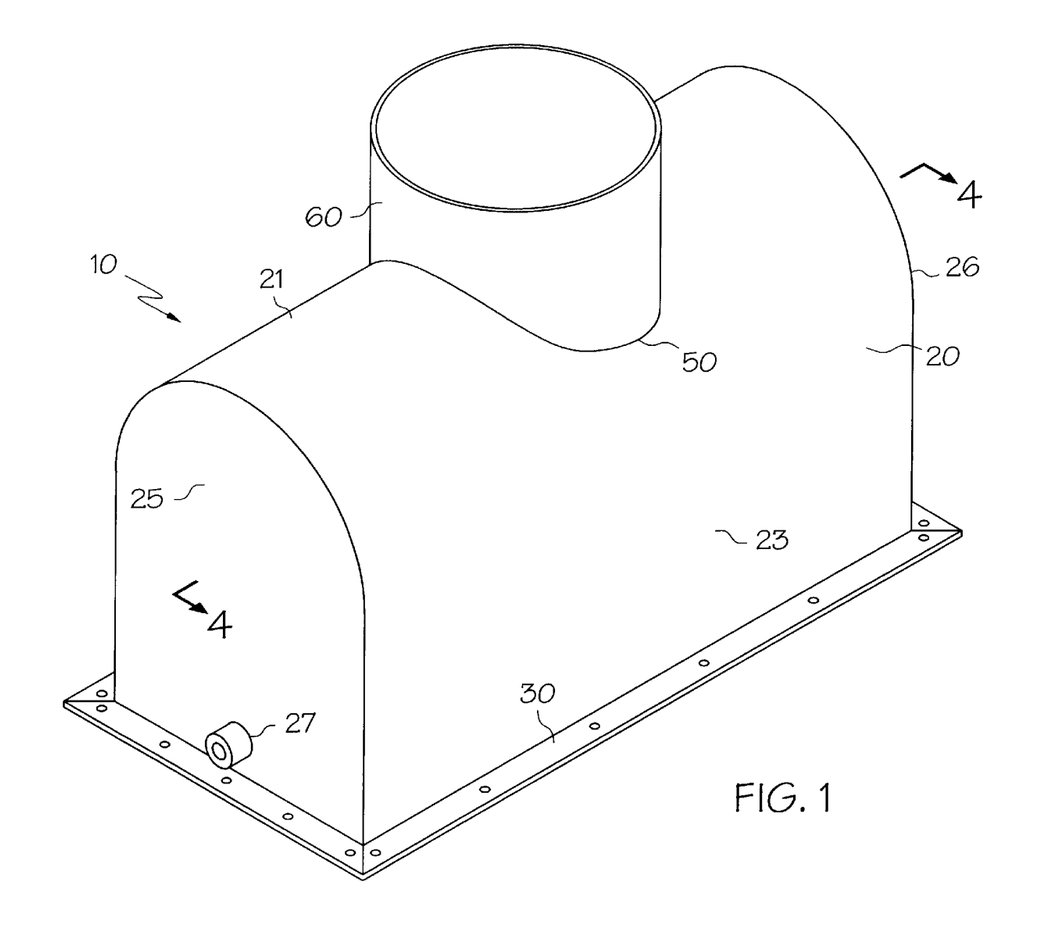
FIG. 1 is a perspective view of one embodiment of a silencer made in accordance with the present invention.
Figure 2:
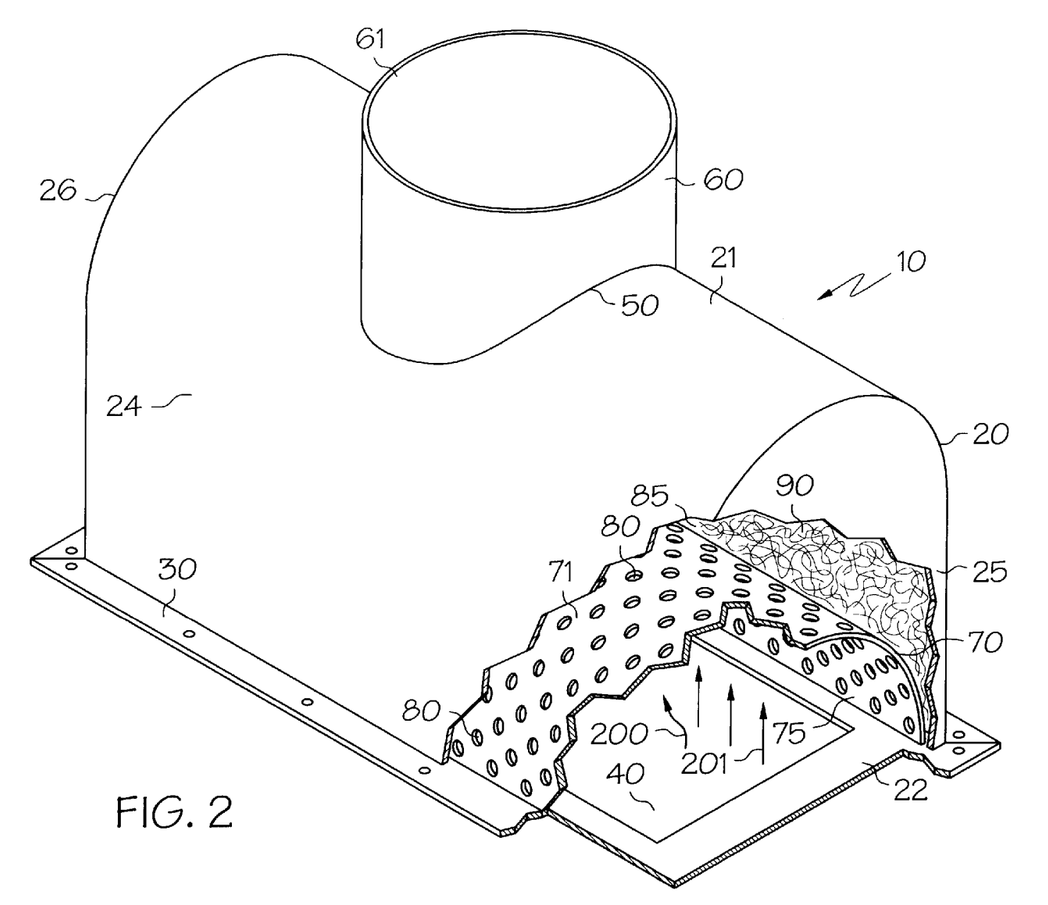
FIG. 2 is a partially cut-away perspective view of the silencer of FIG. 1.
Figure 4:
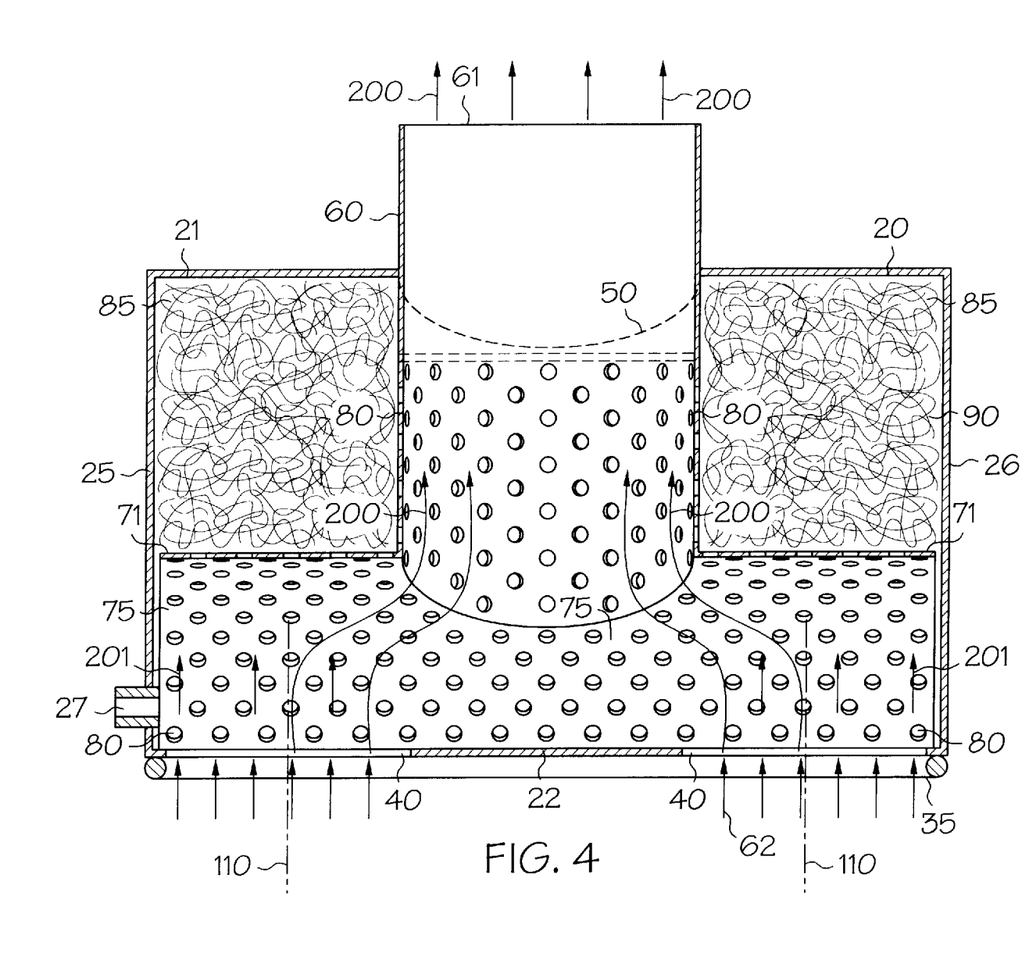
FIG. 4 is a vertical cross-sectional view taken along line 4—4 of the silencer of FIG. 1.

In a preferred embodiment as best shown in FIGS. 1, 2 and 4 there is shown a silencer 10 for reducing acoustic energy in an exhaust stream of gases from a combustion type source. Silencer 10 includes an outer housing 20 having at least one outlet opening 50 and an inner housing 70 provided at least partially within the outer housing 20. Inner housing 70 has at least one inlet opening 40 for receiving the exhaust stream along a flow axis 110 and inlet opening 40 is in fluid communication with the outlet opening 50. Inner housing 70 further includes an acoustic energy interface surface 71 having acoustic absorbing elements 80 oriented in a substantially non-normal direction to flow axis 110. Sound absorbing material 90 is contained between the outer housing 20 and the inner housing 70. In this way, the gas flow is effectively separated from the acoustic energy without significantly increasing the back pressure or resistance to flow of the exhaust stream.

Referring now to the embodiments of FIGS. 1–4, there is shown a silencer 10 having an outer housing 20 and an inner housing 70. Inner housing 70 is located in a uniform spaced relationship with outer housing 20. Preferably, outer housing 20 comprises a generally curved, arcuate or otherwise graduated top surface 21. As best shown in FIG. 4, top surface 21 of outer housing 20 is the effective inner surface of the top of outer housing 20. As further shown in the embodiments of FIGS. 1–4, top surface 21 is preferably provided with a generally U-shaped effective inner surface, wherein inner housing 70 is also preferably provided in the form of a somewhat smaller generally U-shaped shell. It is also preferred that inner housing 70 include a corresponding shape substantially the same contour as outer housing 20. As best shown in FIG. 2, inner housing 70 is preferably held in place by engagement with bottom surface 22. In the preferred embodiment, inner housing 70 is welded to bottom surface 22. However, one skilled in the art would recognize that additional attachment means could also be used with equal facility, such as mechanical locking seams.

Top surface 21 preferably includes at least one outlet opening 50. In the embodiment, as best shown in FIGS. 1, 2 and 4, outlet opening 50 comprises a single, centrally disposed opening. Outlet opening 50 is circumscribed by an exit tube 60. In the embodiments of FIGS. 1–4, exit tube 60 has a substantially uniform interior diameter and is open at its opposite ends 61 and 62. Exit tube 60 is angled at approximately ninety degrees relative to inner housing 70 and the portion of exit tube 60 extending outwardly from opening 50 is imperforate, while the portion extending inwardly from opening 50 has acoustic absorbing elements 80. Exit tube 60 is connected, for example by welding, to inner housing 70. However, other connectors or connection processes such as clamps, soldering, brazing, mechanical connection, or adhesives could also be utilized. This connection joint allows outlet opening 50 to communicate with inner housing 70 and flow passage 75.

As shown in the example of FIGS. 1–4, for the shape of outer housing 20 illustrated, side walls 23 and 24 preferably extend tangentially from adjacent the top surface 21 to bottom surface 22. Silencer 10 includes end walls 25 and 26 connected to top and bottom surfaces 21 and 22, respectively, of outer housing 20. The embodiment illustrated in FIGS. 1–4 includes an optional coupling 27 which extends outwardly from end wall 25. Preferably, coupling 27 is threaded and permits connection to a safety release valve (not shown). Opposite end wall 26 is preferably imperforate in this example.

Figure 5:
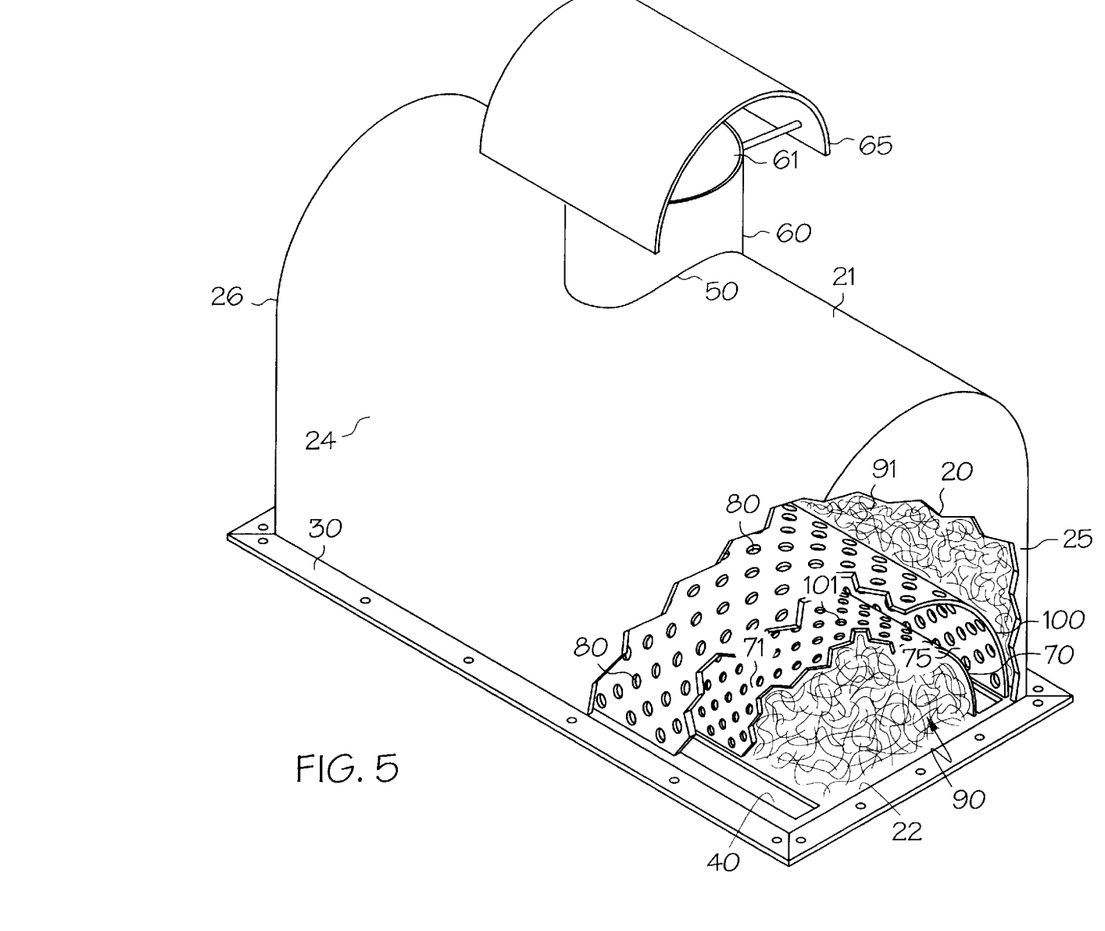
FIG. 5 is a partially cut-away perspective view of another embodiment of a silencer made in accordance with the present invention.

As shown in FIG. 5, the present invention may also include an optional cap or weatherhood 65 connected adjacent to the periphery of exit tube 60. Cap 65 allows the attenuated exhaust stream to pass into the atmosphere while at the same time preventing objects from entering tube 60. Any suitable shape can be used for cap 65. For example, while a U-shaped shell is preferred, a hemispherical, paraboloidal, pyramidal, conical, or other shaped cover may be used.

Figure 3:
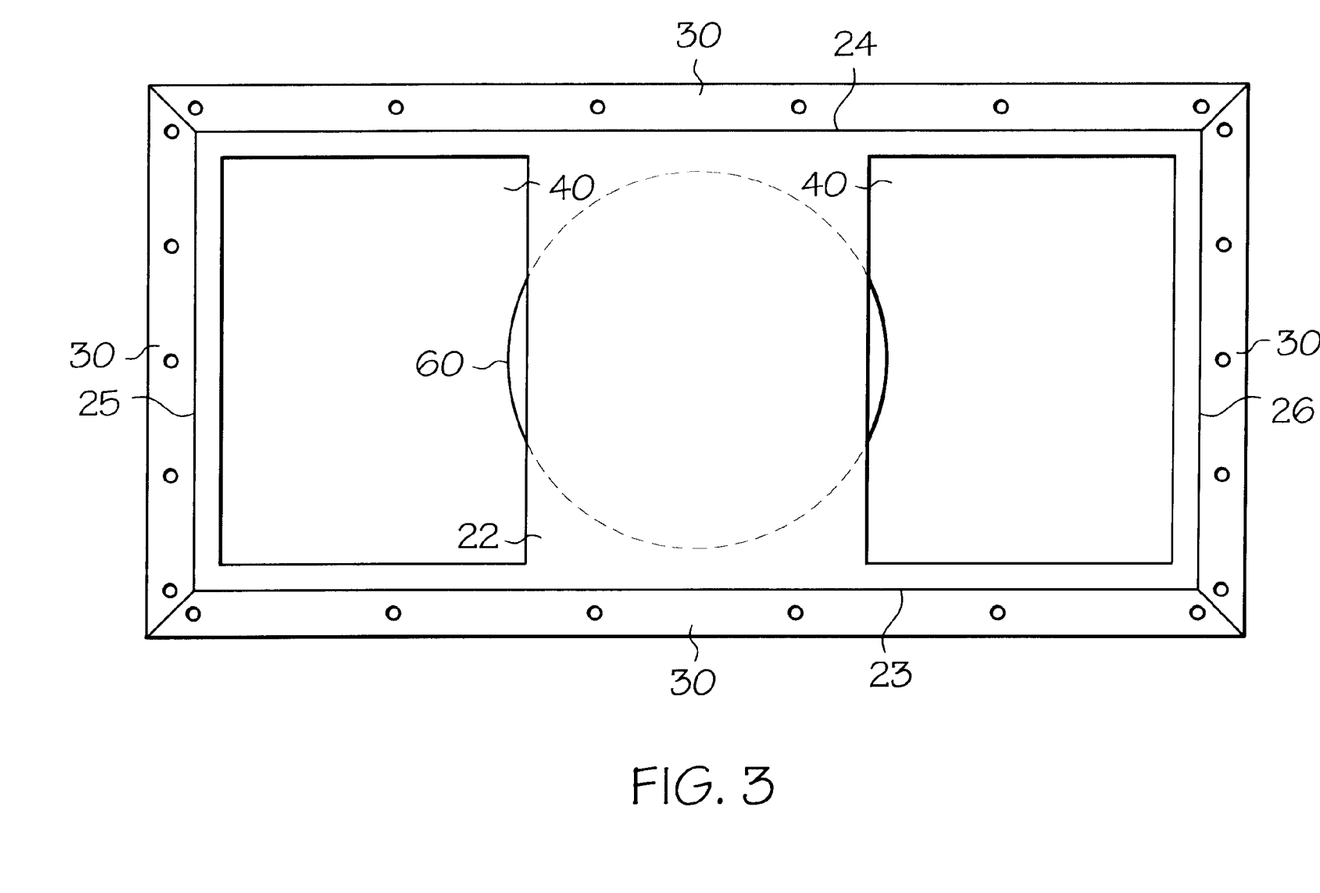
FIG. 3 is a bottom plan view of the silencer of FIG. 1.

As further shown in FIGS. 3–4, inner housing 70 has at least one inlet opening 40 in fluid communication with outlet opening 50 for receiving an exhaust stream of gases along a flow axis 110. Inlet opening 40 is provided adjacent bottom surface 22. In this embodiment, there are two inlet openings 40. It has been observed that best results (i.e. optimal noise reduction without significant back pressure increase) are obtained where the cross-sectional areas of inlet opening 40 are substantially equal and generally from about 90 to about 110 percent of the cross-sectional area of exit tube 60. Any suitable shape can be used for inlet opening 40. However, it is preferred that the shape of inlet opening 40 correspond to the shape of the exit port of the installation which is to be acoustically treated in order to provide an inlet opening with maximum cross-sectional area. Rectangular inlet openings are preferred for optimum results in this example.

Around the outside edge of bottom surface 22 there is preferably provided a flange 30 adapted to be secured to a mating flange (not shown) on the exit port of the installation which is to be acoustically treated. In a preferred application, for example, flange 30 may be secured to a recuperator (not shown) located downstream from a turbo-generator. Around the inside edge of bottom surface 22 is provided gasket 35, which can preferably comprise silicon rubber. Gasket 35 operates to make the connection between flange 30 and a mating flange fluid-tight. However, one skilled in the art would recognize that any suitable material capable of withstanding elevated operating temperatures may be used to provide an appropriate peripheral seal.

Silencer 10 further includes a means for effectively separating the exhaust gas flow from the acoustic energy in an exhaust stream. As shown in FIG. 2, the means for effectively separating the exhaust gas flow from the acoustic energy in an exhaust stream is mounted at least partially within outer housing 20 and preferably comprises inner housing 70. Inner housing 70 has a generally U-shaped conformation and includes a generally curved, arcuate or otherwise graduated acoustic energy interface surface 71 having acoustic absorbing elements 80 oriented in a substantially non-normal direction with respect to flow axis 110. However, one skilled in the art would recognize that any of a variety of separating means could be used with equal facility, as long as the separating means is effective in separating the gas flow from the acoustic energy in an exhaust stream. For example, it is contemplated that the means for effectively separating the gas flow from the acoustic energy in an exhaust stream could comprise a flow passage having a portion which is offset from the flow axis. Other ways of separating the gas flow from the acoustic energy in an exhaust stream could also be achieved by those of ordinary skill in the art as well.

In the preferred embodiment of FIGS. 1–4, acoustic absorbing elements 80 preferably comprise a plurality of perforations that allow acoustic energy to contact sound absorbing material 90. However, one skilled in the art would recognize that any of a variety of acoustic to absorbing elements could be used with equal facility, as long as the acoustic absorbing elements include or otherwise provide access to sound absorbing material 90 as is necessary and appropriate to absorb the acoustic energy associated with high-velocity streams of exhaust gases. For example, it is contemplated that depressions receiving sound absorbing material could be provided on the interface surface 71 of inner housing 70; sound absorbing material could be provided on or as part of inner housing 70; sound absorbing protuberances or ridges could be provided on interface surface 71 of housing 70; or inner housing 70 might be made at least in part of sound absorbing materials. Other ways of making interface surface 71 of inner housing 70 could also be achieved by those of ordinary skill in the art as well.

Other parts of inner housing 70 and parts of exit tube 60 can also include acoustic absorbing elements 80, which may be the same or similar to those in interface surface 71. As best seen in FIG. 4, inner housing 70 and exit tube 60 are preferably provided with acoustic absorbing elements 80 comprising a plurality of perforations which permit fluid communication with chamber 85. Chamber 85 is defined by the inner surfaces of outer housing 20, the outer portions of inner housing 70, and the exterior of exit tube 60 within outer housing 20, and is preferably substantially filled with sound absorbing material 90. In this way, sound absorbing material 90 is located along flow axis 110. Sound absorbing material means any acoustically absorbent material that will allow acoustic energy to enter the acoustic absorbing elements 80 and reduce or eliminate a significant amount of such energy. Any suitable means for absorbing acoustic energy such as metal, glass, and mixtures thereof, ceramic wool, felt, or multiple layers of fine screening, or other materials can be used as the sound absorbing means. Sound absorbing material known as roving or continuous e-glass is available from Owens Corning under the "Advantex" trademark and may be preferred for good sound absorption together with long useful life.

As further shown in FIG. 4, a flow passage 75 is defined between inlet opening 40 and outlet opening 50. A portion of flow passage 75 is offset from flow axis 110 and is located downstream from acoustic interface surface 71. It has been observed that best results have been obtained with this particular configuration where the cross-sectional area of flow passage 75 is less than the cross-sectional area of outlet opening 50.

In operation, exhaust gasses and acoustic energy are received from the exit port of an installation to be acoustically treated, for example from a turbo-generator, by inlet opening 40 and pass into flow passage 75. Immediately upon entering flow passage 75, the exhaust gasses (indicated by the arrows marked 200 in FIG. 4) follow the path of least resistance and are directed by the shape of inner housing 70 towards the opening in exit tube 60. Once in exit tube 60, exhaust gasses 200 are discharged through outlet opening 50 into the atmosphere. In contrast from the gasses themselves, the acoustic energy (indicated by the arrows marked 201 in FIG. 4) follows flow axis 110 and impinges on acoustic absorbing elements 80 located on inner housing 70 and the portion of exit tube 60 extending inwardly from outlet opening 50, thereby being transformed into a large group of small-diameter streams. The acoustic energy 201 which impinges on acoustic absorbing elements 80 is subjected to the acoustic treatment provided by sound absorbing means 90 located within chamber 85. As such, a substantial portion of the acoustic energy 201 is eliminated.

The above arrangement results in a disruption of exhaust flow through the silencer to provide excellent sound absorption, while maintaining relatively low back pressure as the exhaust gasses follow flow passage 75 and are discharged through outlet opening 50 into the atmosphere. For example, it has been found that for a 75 kW turbo-generator at 2500 Hz, a particular application of the silencer such as illustrated in FIGS. 1–4, can provide sound attenuation of about 23 decibels for acoustic energy associated with high-velocity gaseous streams with mass flow rates from about 1.4 to about 1.9 lbs/sec, while still maintaining a back pressure of from about 0.5 to about 0.9 inches of water (in., $H_2O$).

While the silencer of this invention may be made by any suitable method, certain novel manufacturing processes and steps have been found to be exceptionally convenient and effective and to produce a strong, wear resistance silencer.

In a preferred method and with reference to the embodiment of FIGS. 1–4, the outer housing 20, comprising the top surface 21 and side walls 23 and 24, bottom surface 22, and end walls 25 and 26, are individually fabricated. The individual components are preferably roll formed from sheet metal, as known in the art. More preferably, the individual components are roll formed from 321 or 400 series Cres gauge stainless steel. The silencer is then assembled. Alternatively, these components can be formed from a single piece of sheet metal by stamping and bending into shape, as known in the art. Inner housing 70 is welded to bottom surface 22, and exit tube 60 is then welded to inner housing 70 and outer housing 20 is welded to bottom surface 22. At this point, one end wall 25 or 26 is welded to top surface 21 and bottom surface 22. Sound absorbing material 90 is blown into chamber 85 and once chamber 85 is substantially filled with sound absorbing material 90, the opposite end wall is welded to top and bottom surface 21 and 22, respectively. In the preferred embodiment, the weld connection between top surface 21 and end walls 25 and 26 is rounded. Alternatively, this weld connection can be straight. In addition, one skilled in the art would recognize that additional means for connecting the individual components of silencer 10 could also be used with equal facility, such as mechanical locking of the seams, through the use of mechanical connectors, and or other forms of joining such as brazing, high strength adhesives or other connection processes.

Figure 6:
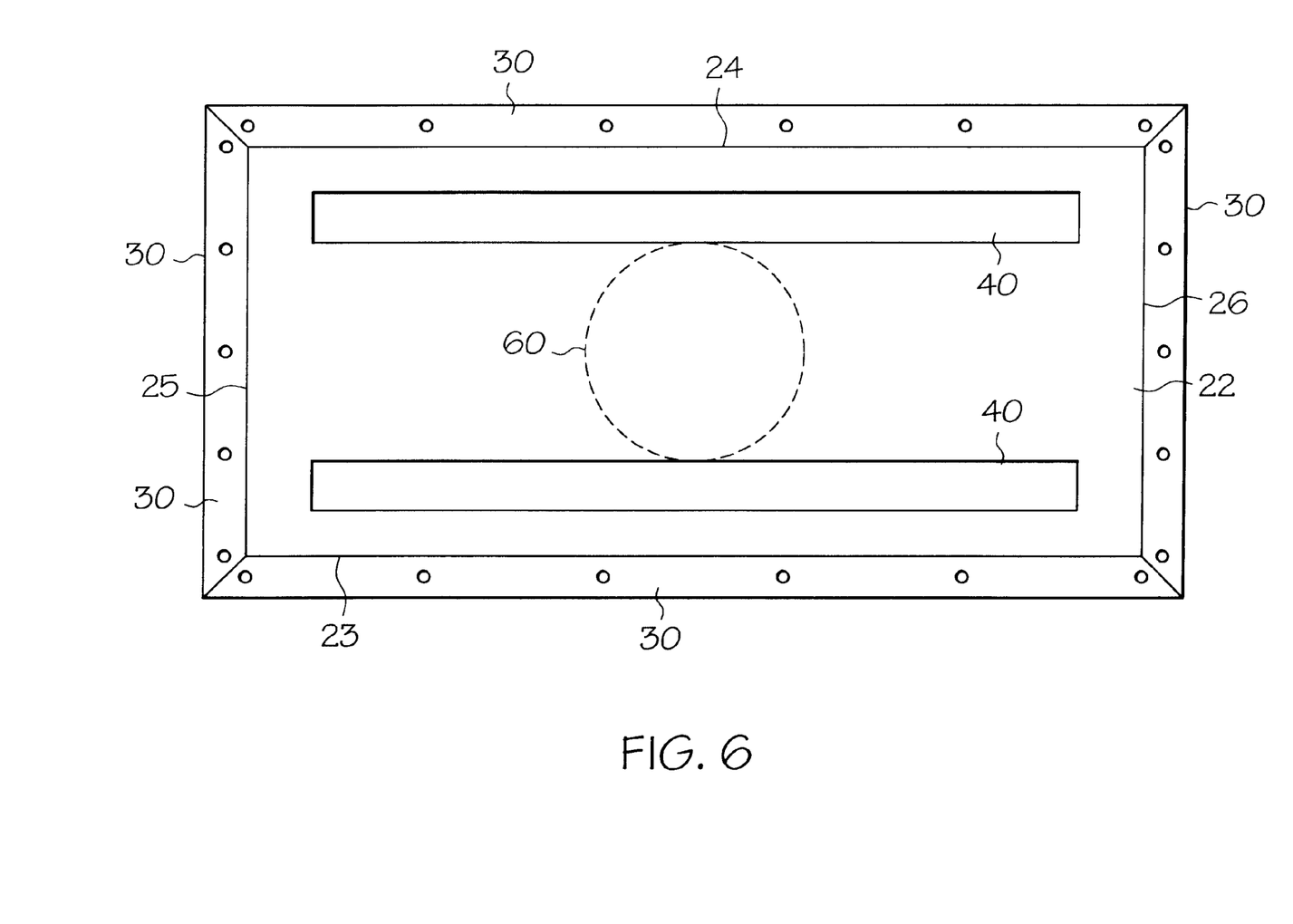
FIG. 6 is a bottom plan view, of the silencer of FIG. 5.

In an alternative embodiment as shown in FIGS. 5 and 6, there is shown a silencer 10 with an outer housing 20 having at least one outlet opening 50. The silencer further includes a middle housing 100 provided at least partially within the outer housing 20 and an inner housing 70 provided at least partially within the middle housing 100. At least one inlet opening 40 is defined between the middle housing 100 and inner housing 70, for receiving the exhaust stream along a flow axis (not shown) and inlet opening 40 is in fluid communication with outlet opening 50. Inner housing 70 and middle housing 100 further include an acoustic energy interface surface 71 and 101 respectively, having acoustic absorbing elements 80 oriented in a substantially non-normal direction to the flow axis (not shown). At least one of the acoustic interface surfaces 71 and 101, is located along the flow axis (not shown). A first sound absorbing material 90 is preferably contained within the inner housing 70 and a second sound absorbing material 91 is preferably contained between outer housing 20 and middle housing 100.

As further shown in the embodiments of FIGS. 5 and 6, silencer 10 has an outer housing 20, a middle perforated housing 100 located in a uniform spaced relationship with outer housing 20, and an inner perforated housing 70 located in a uniform spaced relationship with middle housing 100. Outer housing 20 preferably comprises a generally curved, arcuate or otherwise graduated top surface 21. The top surface 21 of outer housing 20 is the effective inner surface of the top of outer housing 20. As further shown in FIG. 5, top surface 21 is preferably provided with a generally U-shaped effective inner surface, wherein middle housing 100 and inner housing 70 are also preferably provided in the form of a somewhat smaller generally U-shaped shell. It is also preferred that middle housing 100 and inner housing 70 include a corresponding shape substantially the same contour as outer housing 20. As best shown in FIG. 5, middle housing 100 and inner housing 70 are preferably held in place by engagement, for example by welding, with bottom surface 22.

Top surface 21 preferably includes at least one outlet opening 50. In the embodiment, as best shown in FIG. 5, outlet opening 50 comprises a single, centrally disposed opening. Outlet opening 50 is circumscribed by an exit tube 60. In the embodiments of FIGS. 5 and 6, exit tube 60 has a substantially uniform interior diameter and is open at its opposite ends 61 and 62. Exit tube 60 is angled at approximately ninety degrees relative to middle housing 100 and the portion of exit tube 60 extending outwardly from opening 50 is imperforate, while the portion extending inwardly from opening 50 has acoustic absorbing elements 80. As previously described with respect to the embodiments of FIGS. 1–4, exit tube 60 may also include an optional cap or weatherhood 65 connected adjacent the periphery of exit tube 60. Exit tube 60 is connected, for example by welding, to middle housing 100. However, other connectors or connection processes such as clamps, soldering, brazing, mechanical connection, or adhesives could also be utilized. This connection joint allows outlet opening 50 to communicate with middle housing 100 and flow passage 75.

As shown in the example of FIG. 5, for the shape of outer housing 20 illustrated, side walls 23 and 24 preferably extend tangentially from adjacent the top surface 21 to bottom surface 22. Silencer 10 includes end walls 25 and 26 connected to top and bottom surfaces 21 and 22, respectively, of outer housing 20. The embodiment illustrated in FIGS. 5 and 6 includes an optional coupling 27 which extends outwardly from end wall 25. Preferably, coupling 27 is threaded and permits connection to a safety release valve (not shown). Opposite end wall 26 is preferably imperforate in this example.

As further shown in FIGS. 5 and 6, middle housing 100 and inner housing 70 define at least one inlet opening 40 for receiving an exhaust stream of gasses along a flow axis (not shown). Inlet opening 40 comprises two channels defined by middle housing 100 and inner housing 70, which extend between end wall 25 and end wall 26 and is in fluid communication with outlet opening 50.

Around the outside edge of bottom surface 22 there is preferably provided a flange 30 adapted to be secured to a mating flange (not shown) on the exit port of the installation which is to be acoustically treated. In a preferred application, for example, flange 30 may be secured to a recuperator (not shown) located downstream from a turbo-generator. Around the inside edge of bottom surface 22 is provided gasket 35, which can preferably comprise silicon rubber. Gasket 35 operates to make the connection between flange 30 and a mating flange fluid-tight. However, one skilled in the art would recognize that any suitable material capable of withstanding elevated operating temperatures may be used to provide an appropriate peripheral seal.

Middle housing 100 and inner housing 70 each include a generally curved, arcuate or otherwise graduated acoustic energy interface surfaces 101 and 71, respectively, having acoustic absorbing elements 80 oriented in a substantially non-normal direction to a flow axis (not shown). In the embodiment of FIG. 5, acoustic absorbing elements 80 comprise a plurality of perforation that allow acoustic energy to contact sound absorbing material 90. Other parts of middle housing 100, inner housing 70, and exit tube 60 can also include acoustic absorbing elements 80 comprising a plurality of perforations 80 which permit fluid communication with the area within inner housing 70 and the area between outer housing 20 and middle housing 100. A first sound absorbing material 90 substantially fills the area within inner housing 70 and a second sound absorbing material 91 substantially fills the area between outer housing 20 and middle housing 100.

In operation, exhaust gasses and acoustic energy are received from the exit port of an installation to be acoustically treated, for example from a turbo-generator, by inlet opening 40 and pass into flow passage 75. Immediately upon entering flow passage 75, the exhaust gasses follow the path of least resistance and are directed by the shape of flow passage 75 defined by the middle housing 100 and inner housing 70 towards the opening in exit tube 60. Once in exit tube 60, the exhaust gasses are discharged through outlet opening 50 into the atmosphere. In contrast from the gasses themselves, the acoustic energy follows a flow axis and impinges on perforations 80 located on middle housing 100, inner housing 70, and the portion of exit tube 60 extending inwardly from outlet opening 50, thereby being transformed into a large group of small-diameter streams. The acoustic energy which impinges on perforations 80 is subjected to the acoustic treatment provided by sound absorbing means 90 and 91 located in the area within inner housing 70 and the area between outer housing 20 and middle housing 100. As such, a substantial portion of the acoustic energy is eliminated.

In the embodiments shown in FIGS. 1–6, the acoustic absorbing elements 80 in inner housing 70, middle housing 100, and exit tube 60 are preferably a plurality of perforations of uniform size and are in the form of a grid-like arrangement. While any suitable hole arrangement and hole size may be used, perforations 80 preferably have diameters in the 0.125 to 0.500 inch range, more preferably in the 0.125 to 0.375 inch range, and even more preferably in the 0.125 to 0.250 inch range. While round perforations are preferred for an optimum combination of sound absorption and structure strength, perforations of other shapes may be used, if desired. The areas of such perforations are preferably equivalent to the areas of round perforations having the above-mentioned preferred diameters.

While certain specific materials and arrangements have been detailed in the above description of preferred embodiments, these may be varied, where suitable, with similar results. For example, while stainless steel is preferred, the silencer components may be formed from any suitable material such as carbon-steel, titanium, aluminum, high temperature plastics, or sheets of layered or laminate material, or any other suitable material that is heat resistant and non-corrosive.

Also, while some components have been described as being integral and others as separate, it should be understood that integral components can be made and joined in separate pieces, and the separate pieces can be made integral as known in the art.

Having shown and described the preferred embodiments of the present invention, further adaptions of the silencer described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

What is claimed is:

1. A silencer for reducing acoustic energy in an exhaust stream of gases and acoustic energy from a combustion type source, comprising:

an outer housing having at least one outlet opening;

an inner housing provided at least partially within the outer housing and having at least one inlet opening in fluid communication with the outlet opening for receiving the exhaust stream along a flow axis and an acoustic energy interface surface located along the flow axis comprising one or more acoustic absorbing elements oriented in a substantially non-normal direction with respect to the flow axis; and a flow passage between the inlet and outlet openings that is substantially unimpeded and having a portion which is offset from the flow axis.

2. The silencer according to claim 1, wherein the outer housing comprises:

a top surface, the at least one outlet opening being provided adjacent the top surface;

a bottom surface, the at least one inlet opening being provided adjacent the bottom surface;

side walls tangential to the top surface; and end walls.

3. The silencer according to claim 1, wherein the outer housing has an arcuate top surface.

4. The silencer according to claim 1, wherein the top surface of said outer housing has a generally U-shaped effective inner surface.

5. The silencer according to claim 1, wherein the inner housing is located in a uniformed spaced relationship with the outer housing.

6. The silencer according to claim 1, wherein the inner housing has an arcuate acoustic energy interface surface.

7. The silencer according to claim 6, wherein the inner housing comprises a generally U-shaped conformation.

8. The silencer according to claim 1, wherein the acoustic absorbing elements comprise a plurality of perforations.

9. The silencer according to claim 2, further comprising a plurality of inlet openings, each inlet opening being located adjacent the bottom surface.

10. The silencer according to claim 2, further comprising a plurality of outlet openings, each outlet opening being located adjacent the top surface.

11. The silencer according to claim 1, further comprising:

an exit tube extending in the axial direction of the outlet opening through the top surface and connecting the inner housing with the top surface of the outer housing;

the exit tube having a substantially uniform interior diameter and being open at its opposite ends; and the portion of the exit tube extending between the inner housing and the outer housing having acoustic absorbing elements.

12. The silencer according to claim 1, further comprising sound absorbing material substantially filling the area between the outer housing and the inner housing.

13. A silencer for reducing acoustic energy in an exhaust stream of gases and acoustic energy from a combustion type source, comprising:

an outer housing having at least one outlet opening;

a middle housing provided at least partially within the outer housing;

an inner housing provided at least partially within the middle housing, wherein at least one inlet opening is defined between the middle and inner housings for receiving the exhaust stream along a flow axis, wherein the inlet opening is in fluid communication with the outlet opening and the inner and middle housings each having an acoustic energy interface surface comprising one or more acoustic absorbing elements oriented in a substantially non-normal direction with respect to said flow axis, and at least one of said acoustic energy interface surfaces is located along said flow axis; and a flow passage between the inlet and outlet openings having a portion which is offset from the flow axis.

14. The silencer according to claim 13, wherein the middle housing is located in a uniform spaced relationship with the outer housing.

15. The silencer according to claim 13, wherein the inner housing is located in a uniform spaced relationship with the middle housing.

16. The silencer according to claim 13, wherein the inner housing and the middle housing each have a generally arcuate shaped acoustic energy interface surface.

17. The silencer according to claim 13, wherein the acoustic absorbing elements comprise a plurality of perforations.

18. The silencer of claim 13, further comprising a first sound absorbing material substantially filling the area within the inner housing and a second sound absorbing material substantially filling the area between the outer housing and the middle housing.

19. An exhaust system comprising:

a combustion type source; and a silencer, wherein the silencer further comprises an outer housing having at least one outlet opening; an inner housing provided at least partially within the outer housing and having at least one inlet opening in fluid communication with the outlet opening for receiving the exhaust stream along a flow axis and an acoustic energy interface surface located along the flow axis comprising one or more acoustic absorbing elements oriented in a substantially non-normal direction with respect to the flow axis; and a flow passage between the inlet and outlet openings that is substantially unimpeded and having a portion which is offset from the flow axis.

20. An exhaust system comprising:

a turbo-generator;

a recuperator; and a silencer, wherein the silencer further comprises an outer housing having at least one outlet opening; an inner housing provided at least partially within the outer housing and having at least one inlet opening in fluid communication with the outlet opening for receiving the exhaust stream along a flow axis and an acoustic energy interface surface located along the flow axis comprising one or more acoustic absorbing elements oriented in a substantially non-normal direction with respect to the flow axis; and a flow passage between the inlet and outlet openings that is substantially unimpeded and having a portion which is offset from the flow axis.

21. A silencer for reducing acoustic energy in an exhaust stream of gases and acoustic energy from a combustion type source, comprising:

an outer housing having at least one outlet opening;

means for effectively separating the gas flow from the acoustic energy in the exhaust stream, the separating means being mounted at least partially within the outer housing; the separating means including a substantially unimpeded passage for the gas flow;

at least two inlet openings for receiving the exhaust stream along a flow axis, wherein the inlet openings are in fluid communication with the outlet opening; and means for absorbing acoustic energy, the absorbing means located along the flow axis.

22. The silencer according to claim 21, wherein the means for effectively separating the gas flow from the acoustic energy in the exhaust stream comprises a flow passage having a portion which is offset from the flow axis.

23. A silencer for reducing acoustic energy in an exhaust stream of gases and acoustic energy from a combustion type source, comprising:

an outer housing having at least one outlet opening;

at least two inlet openings for receiving the exhaust stream along a flow axis, wherein the inlet openings are in fluid communication with the outlet opening;

a first acoustic energy interface surface comprising acoustic absorbing elements and being located along the flow axis; and a flow passage between the inlet openings and the outlet opening that is substantially unimpeded and having at least a portion downstream of the first acoustic energy interface surface which is offset from the flow axis.

24. The silencer of claim 23, further comprising an inner housing located at least partially within said outer housing, wherein said acoustic absorbing elements comprise openings in said inner housing.

25. The silencer of claim 23, further comprising sound absorbing material adjacent said openings and between at least a portion of said inner and outer housings.

26. A silencer according to claim 1, wherein said silencer maintains a back pressure of from about 0.5 to about 0.9 inches of water (in., $H_2O$).

* * * * *